United States Patent [19]

Dufresne

[11] 4,232,768
[45] Nov. 11, 1980

[54] AUTOMATIC EMERGENCY BRAKE

[76] Inventor: Jacques Dufresne, 6889 Lamont, Montreal, Quebec, Canada, H4E 2T8

[21] Appl. No.: 901,817

[22] Filed: May 1, 1978

[51] Int. Cl.² .................... F16D 49/16; B60K 41/20
[52] U.S. Cl. .......................................... 192/2; 188/75;
188/106 P; 188/171; 188/196 P
[58] Field of Search ................. 192/2, 129 A; 188/75,
188/106 P, 171, 196 P

[56] References Cited

U.S. PATENT DOCUMENTS

| 1,566,485 | 12/1925 | Lautrup | 188/171 |
|---|---|---|---|
| 1,577,999 | 3/1926 | Atkinson | 188/171 |
| 1,860,394 | 5/1932 | Ohler | 188/75 X |
| 2,147,531 | 2/1939 | Heath | 188/171 X |
| 2,951,560 | 9/1960 | Smellie | 188/196 P X |
| 3,253,682 | 5/1966 | Haydu | 188/196 P X |
| 3,830,344 | 8/1974 | Cervenec et al. | 188/75 X |
| 4,132,292 | 1/1979 | Dufresne | 188/75 X |

Primary Examiner—Allan D. Herrmann
Attorney, Agent, or Firm—Raymond A. Robic; Arthur Schwartz

[57] ABSTRACT

An improved brake for winches. The brake has a main brake and an emergency brake. Both brakes are solenoid operated and brake when the power is turned off or fails. Means are provided for slightly delaying the operation of the emergency brake compared to the main brake so that the braking force is applied in stages in an emergency. The brakes are mechanically linked together so that either of the main or emergency solenoids operate both brakes if one of the solenoids fails.

11 Claims, 6 Drawing Figures

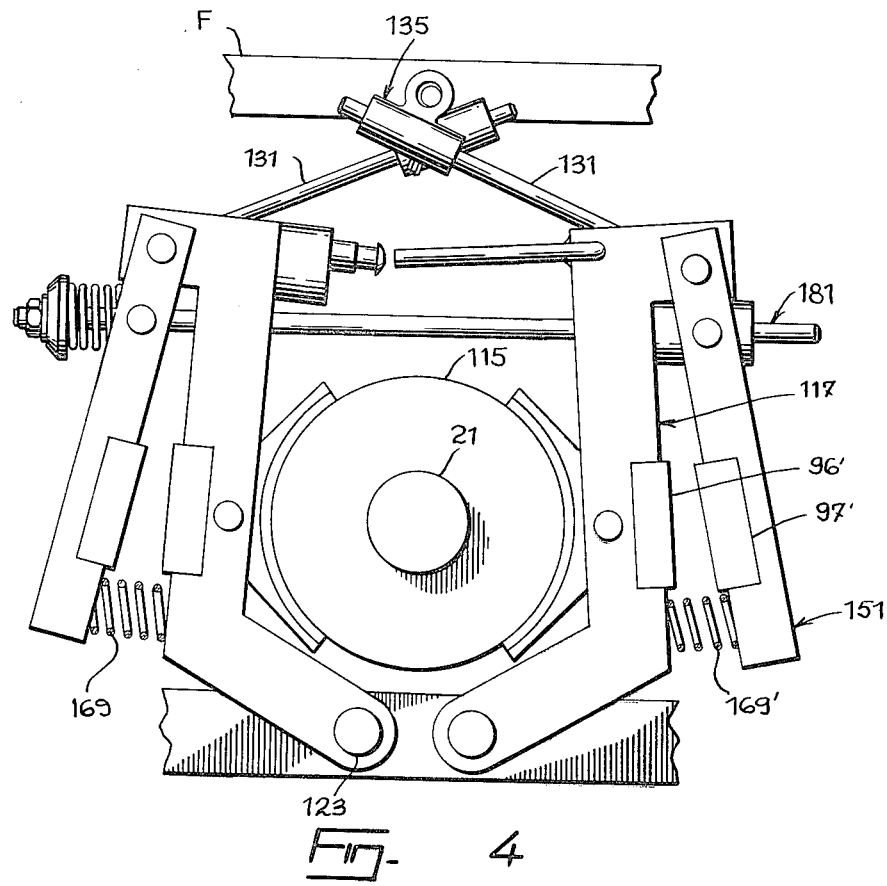
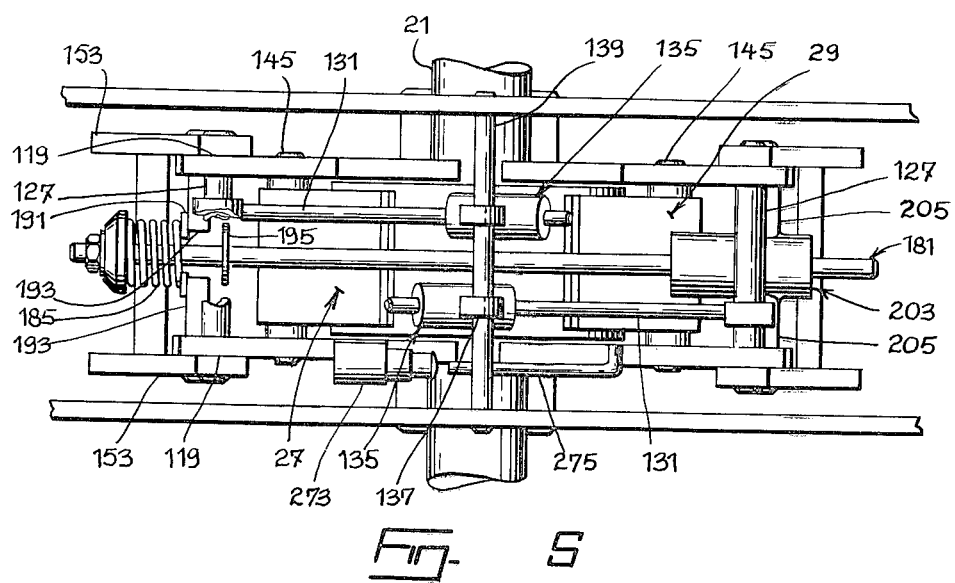

AUTOMATIC EMERGENCY BRAKE

The present invention relates to an improved brake.

The invention more particularly relates to an improved solenoid brake for winches.

As is known, winches are generally used to lift loads. Usually, the winches comprise a cable, wound on a winch drum, to lift loads and a solenoid brake to brake the drum, thus controlling the position of the load on the cable. The solenoid brake comprises a solenoid which is operated off current supplied to the motor rotating the drum and which normally deactuates the brake for the drum when the motor is operating. When the drum motor is stopped, the solenoid is automatically switched off thereby actuating the brake to immediately stop rotation of the drum.

It is known to provide an emergency solenoid brake, also operated off motor current, to back-up the main solenoid brake in case it fails for some reason to operate.

Even with a second emergency brake however, situations arise which can result in potentially dangerous operations. As one example, the emergency solenoid brake in known systems normally operates simultaneously with the main brake in a power failure. This sudden, simultaneous braking force on the winch drum could place too great a load on the cable and cause it to break.

There is also the possibility in known systems of having the emergency brake fail and thus actuate the brake on the winch drum without the operator's knowledge. This can result in overheating and damage to the winch.

Other possible potential dangerous situations exist in the failure of the top limit switch normally provided in crane winches, and in having the winch motor operating under overspeed conditions.

The known winch brakes employ mechanically, independently operable main and emergency brake. If one of the brakes fails, the entire braking load is unevenly carried by the other brake.

No provision is made in known winch brakes for easily adjusting the main and emergency brakes due to brake wear.

The purpose of the present invention is to provide a brake, particularly a winch brake, which is safer in operation than known brakes and which avoids the above mentioned drawbacks resulting in potentially dangerous operating situations.

More especially, it is an object of the present invention to provide a winch brake comprising means for slightly delaying the operation of the emergency brake in relation to the operation of the main brake so as to apply a braking force in stages to the winch in an emergency. This eliminates, or at least minimizes, possible breaking of the winch cable.

It is another object of the present invention to provide a winch brake comprising means for automatically shutting off the winch motor in the event that the solenoid on the emergency brake fails. This serves to prevent damage to the brake unknown to the operator.

It is a further object of the present invention to provide a winch brake comprising means for providing back up for the limit switch in case of failure, and particularly in an emergency situation, and means for preventing damage due to the winch motor operating overspeed.

It is still a further object of the present invention to provide a winch brake in which the main and emergency brakes are operatively and mechanically linked to each other so that the operation of either the main or emergency brake operates both brakes. This arrangement gives a greater and more uniformly applied braking force, and also maintains operation of the brake even if one of the main or emergency brake solenoids fail.

It is also another object of the present invention to provide a brake comprising self-adjusting means for compensating for brake wear. Self-adjusting wear means are provided for each brake independently and for the mechanical means linking both brakes together.

More especially, the improved brake according to the present invention comprises a first main brake and a second emergency brake. First means are provided for actuating the first brake, and second means are provided for actuating the second brake in an emergency. Means are provided for delaying operation of the second means relative to the first means to apply first and second braking forces in sequence in an emergency.

In accordance with the present invention, the delay means comprises an under voltage relay for shutting off current to the second brake to actuate it as the generator runs down in the emergency situation.

The second means for actuating the second brake preferably includes an alternating motor operating a flywheel which in turn operates a generator, the flywheel operating the generator when the alternating motor stops due to a power failure.

The second means for actuating the second brake may also include means for automatically stopping the motor rotating the member to be braked in case the second brake fails and is inadvertently actuated.

The second means may further include limit switch means for actuating the second brake if a limit of movement, controlled by the member, is approached.

According to another aspect of the present invention, the improved brake for a rotatable member mounted on a frame comprises first and second support means movably mounted on the frame on both sides of the rotatable member. Each support means carries a brake and includes means for pivotally attaching one of its ends to the frame, means for loosely attaching its other end to the frame and means for mounting the brake on it, intermediate its ends. The brake also comprises means for moving each support means relative to the frame to brake the rotatable member and means for mechanically connecting the two support frames together so that both of the brakes are operated by movement of only one of the support means, if one of the moving means has failed.

In accordance with the invention the moving means comprises first and second brake frames pivotably connected to the support means at the loosely attached ends thereof, spring means positioned between the brake frames and the support means for moving them apart to brake, and means for normally retaining the brake frames and support means together, against the force of the spring means, in a non-braking position.

Advantageously, the improved brake may also comprise means for moving the brake support means to brake the rotatable member and means for automatically adjusting each brake support means closer to the rotatable member as the brakes wear.

The present invention will be better understood with reference to following description of one embodiment, taken in connection with the accompanying drawings in which:

FIG. 4 is an elevation view of the brake during operation;

FIG. 5 is a plan view of the brake; and

Figures 3, 6:
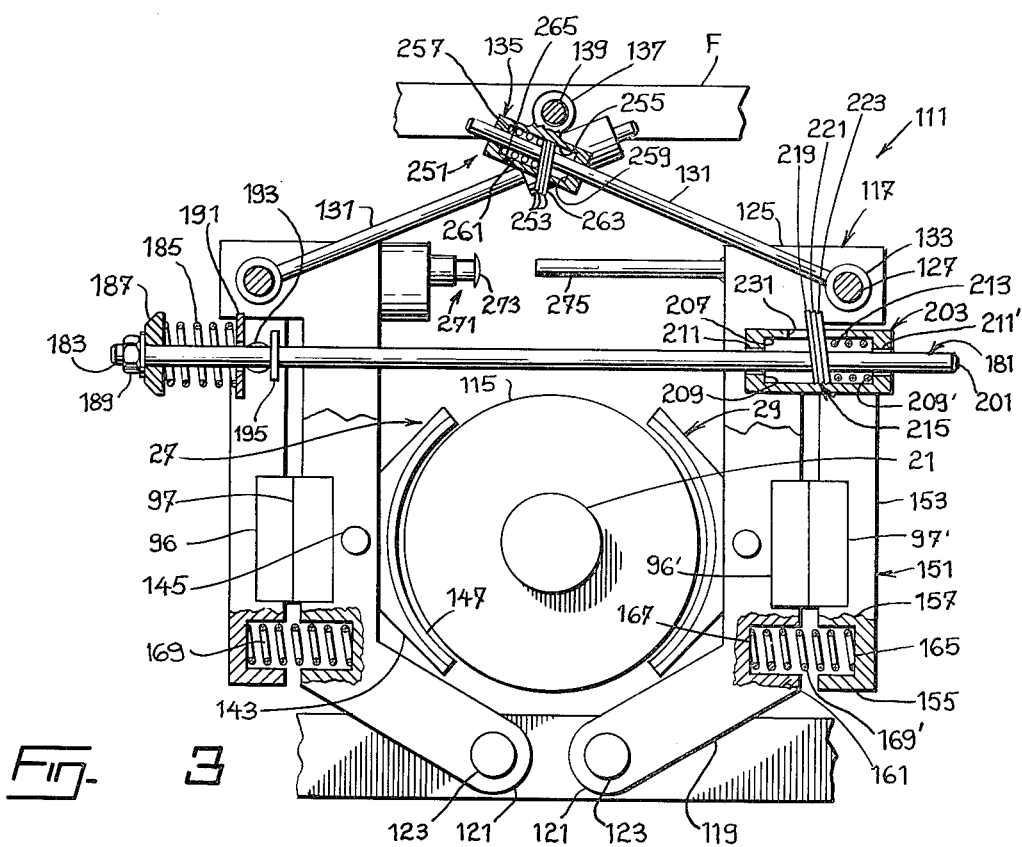
FIG. 3 is an elevation view, in partial section, of the brake, for the crane, at rest.

FIG. 6 appearing on the same sheet as FIG. 3, is an elevation view of the brake during operation with a malfunction.

Figure 1:
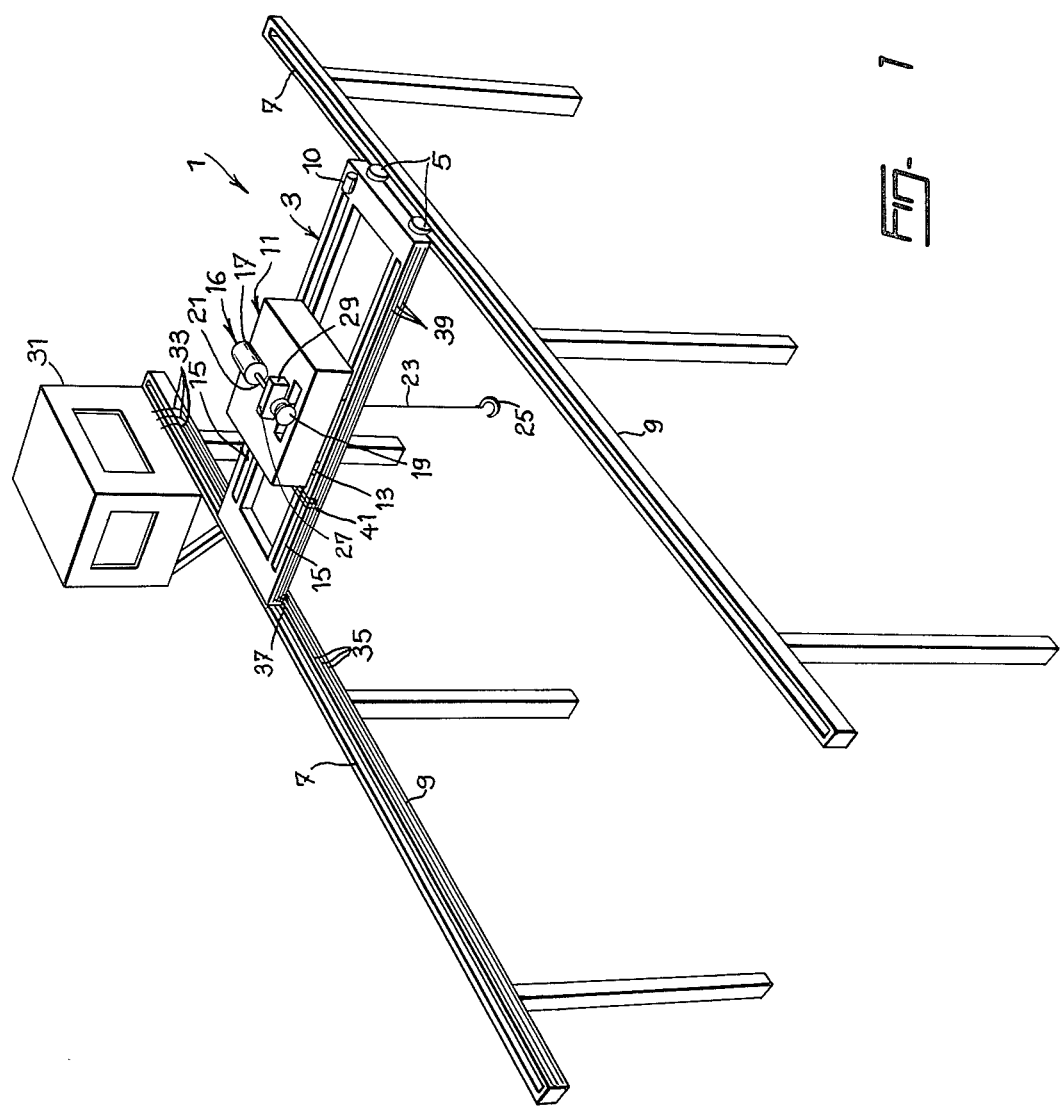
FIG. 1 is a perspective view of a travelling crane.

Referring to the drawing, the brake is shown employed in a travelling crane although it can be used in other cranes or hoists. As shown in FIG. 1, the travelling crane 1 has a horizontal beam 3 supported at each end by wheels 5 running on rails 7 which are mounted on elevated supports 9. The beam 3 extends transversely between the supports 9 and travels along them transporting a load. One or more of the wheels 5 are operated by a motor 10 to move the beam 3 along the supports 9.

A travelling carriage 11 is mounted on beam 3. The carriage 11 has wheels 13 which run on tracks 15 on the beam between the supports 9. The carriage 11 carries a winch 16 comprising a motor 17 and a drum 19 rotatably operated by the motor 17 via a shaft 21. A cable 23 is wound on the drum 19. The cable 23 has a hook 25 for carrying loads. A main brake 27 is provided on the shaft 21 for stopping rotation of drum 19. A second emergency brake 29 is also provided on the shaft 21 for stopping rotation of drum 19 if the main brake 27 fails. An operator's cab 31 is mounted on or adjacent one of the elevated supports 9. The operator within the cab controls the crane through suitable controls.

Figure 2:
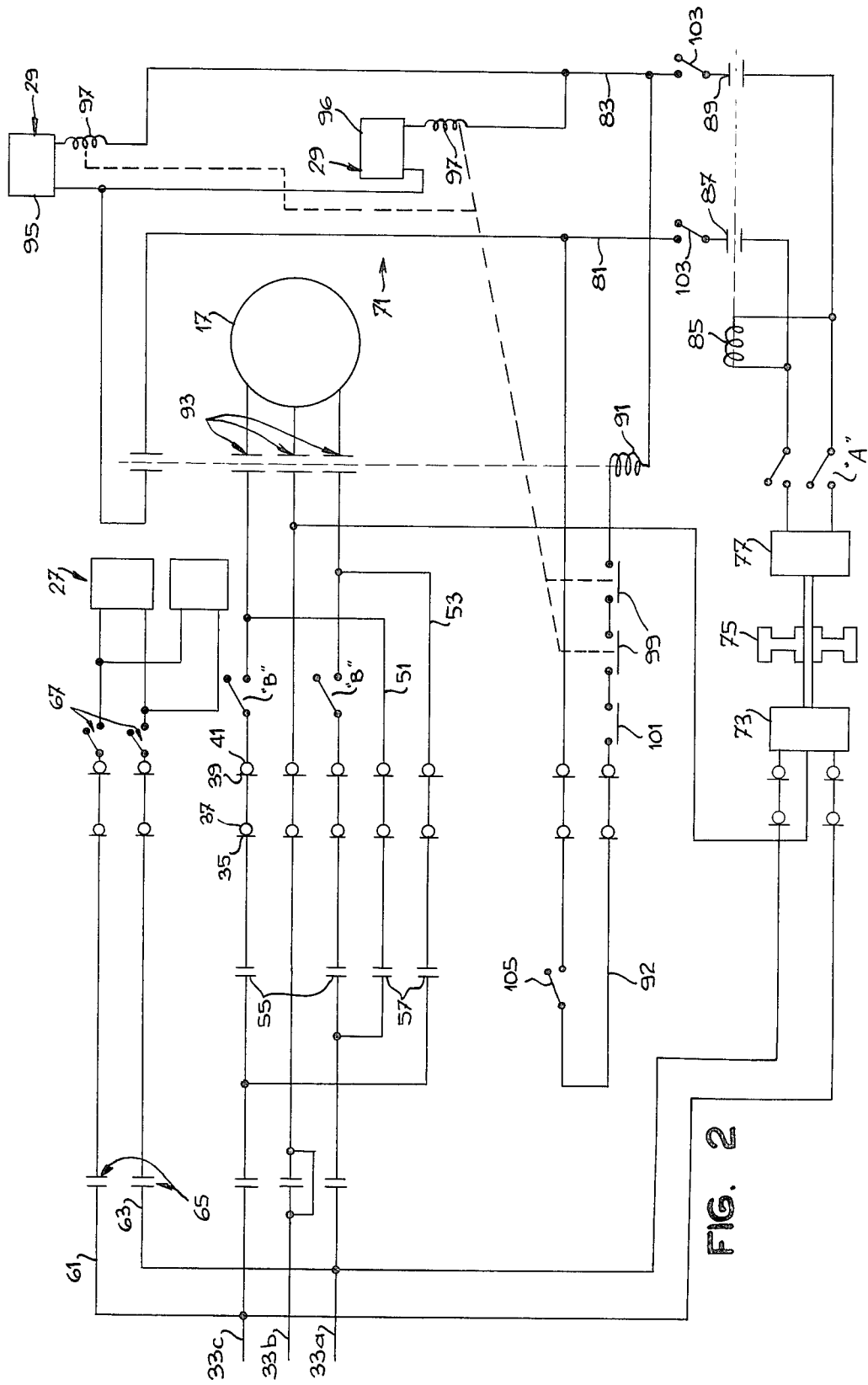
FIG. 2 is a schematic view of the wiring for the crane.

As shown in FIG. 1, and schematically in FIG. 2, power to run the crane 1 is provided by three main power lines 33 from a power source. The lines 33 run to the cab 31, and from the cab along one support 9 as live rails 35. Rollers 37, on beam 3 contact the rails 35 to transfer the power to beam 3. Live rails 39, similar to rails 35, run along beam 3 and rollers 41, on carriage 11, transfer the power from the beam to the carriage 11 and to the motor 17. As shown in detail in FIG. 2, the three main power lines 33a, 33b, 33c are connected directly to the hoist motor 17 via the rails 35 and rollers 37, and the rails 39 and rollers 41. A lead 51 from line 33a is connected to line 33c and a lead 53 from line 33c is connected to line 33a via rails 35 and 39 and rollers 37 and 41, to reverse power to the motor 17 thus allowing hook 25 to be raised or lowered. Contactors 55 in lines 33a and 33c and contactors 57 in lines 51 and 53 control the direction of rotation of drum 19.

A pair of lines 61 and 63 also lead from main power lines 33a and 33c via rails 35 and 39 and contact rollers 37 and 41, to the main brake 27. The main brake 27 is a solenoid brake with power supplied by lines 61 and 63. The brake 27 has a pair of electromagnets which are normally activated via lines 61 and 63 and act against spring pressure to release the brake 27. When the power in lines 61 and 63 is broken by a brake contactor 65 in the cab 31, the brake 27 operates to stop drum 19. Preferably, the brake contactor 65 is automatically operated by the contactors 55 and 57 so that when motor 17 is stopped, the brake 27 is automatically operated. A limit switch 67 is provided in lines 61 and 63 for braking drum 19 in case hook 25 is raised too close to beam 3. Suitable leads and switches (not shown) are also provided from lines 33a, 33b and 33c for operating the motor 10, in a similar manner to motor 17, to run the beam 3 back and forth along supports 9.

The brake described above is typical of known systems. In accordance with the present invention, an emergency brake 29 is provided for controlling rotation of the drum 19, which brake 29 is operated by an emergency circuit 71. As shown in FIG. 2, the emergency circuit 71, mounted on carriage 11, has an alternating motor 73 operated by power tapped from the power lines 33. The motor 73 rotates a flywheel 75 which stores energy. The flywheel 75 in turn operates a generator 77 which delivers power to the emergency brake 29 via lines 81 and 83. An under voltage relay 85 is connected across lines 81 and 83 operating contactors 87 and 89 in lines 81 and 83 respectively.

The emergency braking system operates in the following manner. If a power failure occurs, main brake 27 operates immediately to brake the lead. Power is still supplied through flywheel 75 and generator 77 to brake 29 via lines 81 and 83. The emergency brake 29 remains off for a short time until the flywheel 75 slows down. The voltage then drops, and this drop is sensed by the relay 85 to open contactors 87 and 89 and thus actuate brake 29. The two stage braking action by brakes 27 and 29 provides positive load control even though power has failed. When power is restored, the emergency brake 29 remains on, even though the main brake 27 may be immediately released, until the relay 85 closes, closing the contactors 87 and 89 and thus releasing brake 29. The relay 85 closes once the flywheel 75 builds up enough speed to get a high enough output from the generator 77. This provides additional control of the load on the hoist during power interuptions.

The emergency circuit 71 also includes a relay 91 for operating contactors 93 in the power lines 33 feeding the drum motor 17. The relay 91 is connected across the lines 81 and 83 via line 92. In an emergency, when the power fails, and flywheel 75 runs down, the circuit 71 is opened, opening the relay 91 and thus the contactors 93. When power is again suddenly restored, the switches 93 are still open preventing operation of the motor 17 while the emergency brake 29 remains on. Once the relay 85 closes however, to release brake 29, the relay 91 also closes, closing the contactors 93 and only then permitting motor 17 to operate.

Safety means can be provided for avoiding damage to the emergency brake if, for any reason, the solenoids 95 and 96 operating the brake fail. The emergency solenoids 95 and 96 are normally wired in a manner to operate at two hundred and fifty volts, tapped from five hundred volts supplied by the generator. The relays 97 are provided across the solenoids 95 and 96 normally inoperative at two hundred and fifty volts. If the solenoids break however, the relays 97 are subjected to five hundred volts and operate to open switches 99 in line 92 containing the relay 91. This causes the relay 91 to open and shut off the motor 17. If the motor 17 were not shut off when the solenoids failed, throwing the brakes on, the drum would overheat and be damaged without the operator's knowledge until it was too late.

A centrifugally operated over-speed switch 101 could be provided in the line 92 to open the line and thus shut off the motor 17 if it over-speeded. Also, a limit switch 103 could be provided in the emergency circuit to apply the emergency brake if the load were to be raised too high and damage the beam. Limit switch 103 acts as a safety switch in case regular limit switch 67 fails during normal operation.

The circuit 92 could be extended back to the operator's cab 31 via the tracks 35 and 39 and rollers 37 and 41 and can have a stop switch 105 therein in the cab so the operator could shut down the motor 17 during any emergency.

While the above improved brake arrangement can work with known normal and emergency winch brakes, it is preferred to employ a novel double-acting solenoid brake as will be now described having reference to FIGS. 3 to 6.

The double-acting solenoid brake 111 is mounted on a frame "F" on a carriage 21 to brake the rotatable shaft 11 carrying a cylindrical brake drum 115. The brake 111 has a pair of support frames 117. The support frames 117 face each other on opposed sides of the shaft 21 with the drum 115 between them. Each frame 117 comprises a pair of spaced-apart support members 119. The lower portions of the support members 119 are angled to extend nearly under the shaft 21 with the lower ends 121 pivotably connected to the frame "F" by pivot pins 123. The upper ends 125 of the support members 119 of each frame 117 are joined together with a pin 127.

Each support frame 117 is loosely connected at its upper end to the machine frame "F." A connecting rod 131 is provided to loosely connect each support frame 117 to the machine frame "F." The connecting rod 131 has a ring 133 at one end through which pin 127 is passed. The other end of rod 131 carries a fitting 135 with a ring 137 on top of the fitting. A pin 139, having a diameter smaller than the bore of ring 137, is threaded through the ring 137 to connect the rod 131 to frame "F." The pin 139 is fixedly mounted to frame "F" and extends parallel to, and is located directly above the shaft 21. The loose connection of the upper ends of support frames 117 to machine frame "F" allows the frames 117 to move slightly, about pivot pins 123, toward or away from the brake drum 115.

Each support frame 117 carries a brake intermediate its ends. One brake forms the normal brake 27. The other brake forms the emergency brake 29. Both brakes are identical in construction. Brake 27 comprises a brake pad 143, pivotably connected between support members 119 by a pin 145, and a brake lining 147 affixed to the pad. The pad 143 projects inwardly from between the support members 119 toward the drum 115. The inner surface of the pad 143, facing the drum 115 and carrying the brake lining 147, is concentric with the drum 115.

Means are provided for moving each support frame 117 toward the drum 115 to apply a braking force. The moving means comprise a brake frame 151 located adjacent each support frame 117. Each brake frame 151 comprises a pair of spaced-apart brake frame members 153. The lower ends 155 of the members 153 are joined together by a cross-bar 157. The upper ends 125 of the support members 119 of frame 117 by a pin 127.

A cross-bar 161 extends between support members 119 of each support frame 117 located adjacent cross-bar 157 on each adjacent brake frame 151. The cross-bars 157 and 161 have aligned, facing pockets 165 and 167 respectively. A compression spring 169 (or 169') is mounted in the pockets 165 and 167 to move the frames 117 and 151 apart, about the pin 127.

Means are also provided for operatively connecting the two opposed brakes 27 and 29 together. These mechanical connecting means comprise a rod 181 extending between the brake frames 151 above the drum 115. One end 183 of rod 181 carries a compression spring 185 around it. A stop disc 187 is fixed at the one end 183 by a nut 189 threaded onto the end 183 of rod 181. One end of the spring 185 rests against the stop disc 187. A stop washer 191 is loosely placed on rod 181 bearing against the other end of spring 185, opposite the fixed stop 187. A stop rod 193 projects inwardly from the side of each brake frame member 153 toward the opposed brake frame member 153 of the brake frame 151. The stop rods 193 project toward each other and toward the connecting rod 181. Because of the spring 185, the stop washer 191 normally is pushed against the stop rods 193. A stop ring 195 is also fixed on connecting rod 181 spaced inwardly from stop disc 187.

The other end 201 of rod 181 is loosely attached to the other brake frame 151 via a fitting 203. The fitting 203 has a pair of pins 205 extending from its sides to pivotably attach it between the brake frame members 153 and comprises a cylindrical bore 207 extending perpendicular to the pins 205. The bore 207 is closed by two end walls 209 and 209' provided with aligned holes 211 and 211' through which the connecting rod 181 passes. A stop member 215 is mounted on the rod 181 within the bore 207 between the end walls 209 and 209'. A spring 213 is mounted in the bore 207 about the rod 181. The spring 213 is located between the stop member 215 and the outer end wall 209'. The stop member 215 is mounted for one-way movement on the rod 181. To this end, the stop member 215 can comprise three washer elements 219, 221 and 223. The elements preferably are made from metallic material. The elements have a central bore slightly larger than the diameter of rod 181. The stop member 215 sits slightly askew on rod 181, the elements 219, 221, and 223 bearing on rod 181 to frictionally hold the member 215 in place against the force of spring 213. A top slot 231 is provided in the fitting 203 through which a portion of the stop member 215 projects. The slot 231 allows for some longitudinal movement of rod 181 relative to the fitting 203 and thus to the other brake frame 151. The stop washer member 215, mounted for one-way movement on rod 181, permits the connecting means to be adjusted for brake wear. As the brake linings 147 become worn, the frames 117 swing together about pivots 123 over a slightly greater arc. The frames 117 slide together slightly along rod 181 to accomodate this wear, and when braking is completed and the frames are moved away from the drum 115, the stop member 215 prevents the frames from returning to their original position. Thus, the frames 117 are now adjusted slightly closer to accommodate brake wear. When the brake linings 147 are replaced, the stop element is reset toward the end of rod 181 providing accommodation for the thicker new brake linings.

From the above, one can see that the normal and emergency brakes 27 and 29 carried by the support frames 117, are both operated by the compression springs 169 and 169' which move the frames 151 mechanically connected by the rod 181 apart from the support frame 117 about the pin 127.

To inactive the compression spring 169 (or 169') a solenoid 96 (or 96') is mounted on each support frame 117, facing the brake frame 151, just above the cross-bar 161. A second solenoid 97 (or 97') is mounted on each brake frame 151, facing the solenoid 96 (or 96'), just above the cross-bar 157. When the solenoids 96, 96', 97 and 97' are actuated, (by lines 61 and 63 and circuit 71 respectively, not shown in FIGS. 3 to 6), the brake frames 151 connected by the rod 181 and their respective support frames 117 are pulled together against the force of the spring 169 and 169' releasing the brakes 27 and 29 from the drum 115. When the solenoids 96, 96', 97 and 97' are deactuated, the spring 169 and 169' move the frames 117 and 151 apart about the pin 127. The loose connection between the top of the frame 117 and the machine frame "F," allows the frame 117 to pivot slightly about the pins 123 toward the drum 115. Both actions result in pressing the brake 27 or 29 against the drum 115 to apply a braking force.

It can be seen that if one of the solenoid pairs malfunctions, the connecting rod 181 also operates to work the malfuncting brake. Thus, as shown in FIG. 6, when the right hand emergency solenoids 96' and 97' fail to operate and release the spring 169' to provide braking, the left hand brake frame 151 pulls the rod 181 to the left via the stop rods 193 when its main brake solenoids 96 and 97 operate. As the rod 181 is pulled to the left brake pad 143 is moved against the drum via frames 117 and 151.

Preferably, each brake 27 and 29 is further provided with a separate, automatic, wear adjustment means. These individual wear adjustment means 251 comprise three sliding washers 253 mounted on connecting rod 131 within a bore 255 in the fitting 135. The bore 255 has endwalls 257 and 259 through which the rod 131 passes. Washers 253 having a bore slightly larger than the diameter of the rod 131, are mounted slightly askew thereon, adjacent one another so as to permit the rod 131 to move toward fitting 135 but not away. A spring 261, between the washers 253 and the endwall 257 biases the washers 253 in their locking position. A tab 263 on the washers 253 projects through a longitudinal slot 265 in fitting 135 to allow the washers to be reset when replacing worn brake linings. Again, each wear adjustment means 251 permits each brake to be automatically, individually adjusted as the brake lining wears. The washers 253 allow rod 131 and frames 117, 151 to slightly move about pivot 123 toward fitting 135 to adjust for wear while still providing the same braking force.

Means 271 can be provided to indicate that the brakes have worn enough to require replacing. The indicating means 271 can comprise a switch 273 mounted on one frame 117 and a switch actuator 275 mounted on the other frame 117 and facing switch 273. Actuator 275 is spaced a distance from switch 273 equal to the amount of wear that the brake linings may have. When the actuator has moved through this distance and actuates the switch 273, a light or another type of indicator is turned on in the operator's cab to indicate that the brake linings need replacement.

Although the above mentioned, preferred embodiment of the invention has been described only with reference to a travelling crane, it should be understood that it could be similarly used in an automobile vehicle, in a train or in any apparatus device wherein a main brake and an emergency brake are requested.

Similarly, some original, improved mechanical or electrical parts of the brake according to the invention could be used alone or in combination in other apparatuses or devices. For example, it is obvious that the above described means provided for automatically adjusting the brake members when the brake-linings become worn, could be used in any transportation vehicle.

It should also be understood that various parts of the above mentioned, preferred embodiment of the invention could be replaced by technical equivalents well known by those skilled in the art. Thus, for example, in case of emergency, the circuit 71 could be actuated by a conventional pneumatic system rather than by the flywheel 75.

I claim:

1. An improved brake for a rotatable member mounted on a frame, comprising:

first and second support means mounted on the frame on both sides of the rotatable member, each support means carrying a brake and including means for pivotably attaching one of its ends to the frame, means for loosely attaching its other end to the frame, and means for mounting the brake on it intermediate its ends;

means on each support means for moving it relative to the frame to brake the rotatable member, said moving means comprising first and second brake frames pivotably connected to the support means at the loosely attached ends thereof, spring means positioned between the brake frames and the support means for moving them apart to brake, and means for normally retaining the brake frames and support means together, against the force of the spring means, in a non-braking position; and means for mechanically connecting the two support means together through the brake frames so that both of the brakes be operated by movement of only one of the support means if one of the moving means has failed.

2. A brake as claimed in claim 1, wherein the connecting means comprises a connecting rod extending between the brake frames adjacent the other ends of the support frames, and means for resiliently connecting the rod to at least one of the brake frames.

3. A brake as claimed in claim 2, including means for automatically adjusting the connecting rod at one brake frame connection to move the brake frames closer together as the brake wears.

4. A brake as claimed in claim 1, wherein the retaining means comprise solenoid means mounted on the brake frame and support means.

5. A brake as claimed in claim 1, including means for automatically adjusting each brake support means closer to the rotatable member as the brake wears, said automatic adjusting means forming part of the loose attaching means.

6. A brake as claimed in claim 1, including separate moving means for each brake support means.

7. A brake as claimed in claim 6, including means for operatively connecting the two support means together so that one moving means moves both support means together if the other moving means fails.

8. An improved brake for a member to be braked comprising a first main brake, a second emergency brake, first means for actuating the first brake to apply a braking force to the member, second means for actuating the second brake to apply a braking force to the member in an emergency situation, and means for delaying operation of the second means relative to the first means to apply the first and second braking forces in sequence in the emergency, said delaying means being an undervoltage relay in the output from a generator, said second actuating means comprising a flywheel rotated by a motor, and a generator operated by the flywheel for a limited time when power fails.

9. A brake as claimed in claim 8, including a motor operating the member to be braked and means actuated by the second actuating means, for opening the circuit shutting off the motor.

10. A brake as claimed in claim 9, wherein said second actuating means is a solenoid provided with safety means for shutting off the motor if the solenoid fails.

11. A brake as claimed in claim 8, including limit switch means in the second means for actuating the second brake if a limit of movement by the member is approached.

* * * * *